United States Patent
Eidam et al.

(10) Patent No.: US 6,540,055 B2
(45) Date of Patent: Apr. 1, 2003

(54) DRIVING ARRANGEMENT WITH A FREE-WHEEL COUPLING

(75) Inventors: Manfred Eidam, Wilthen (DE); Stefan Rauschenbach, Grosspostwitz (DE)

(73) Assignees: GKN Walterscheid GmbH, Lohmar (DE); GKN Walterscheid Getriebe GmbH, Kirschau (DE)

( * ) Notice: Subject to any disclaimer, the term of this patent is extended or adjusted under 35 U.S.C. 154(b) by 0 days.

(21) Appl. No.: 09/866,004

(22) Filed: May 25, 2001

(65) Prior Publication Data

US 2002/0063029 A1 May 30, 2002

(30) Foreign Application Priority Data

May 25, 2000 (DE) .......................................... 100 25 720

(51) Int. Cl.⁷ .............................................. F16D 41/12
(52) U.S. Cl. ........................................ 192/46; 192/41 R
(58) Field of Search ............................... 192/46, 41 R, 192/42; 188/82.7, 82.77

(56) References Cited

U.S. PATENT DOCUMENTS

| | | | |
|---|---|---|---|
| 883,461 A | * 3/1908 | Ilg | .......................... 192/41 R X |
| 3,708,042 A | 1/1973 | Krause et al. | .............. 188/73.2 |
| 4,494,637 A | 1/1985 | Gotoda et al. | |
| 4,548,316 A | * 10/1985 | Maurer | ................. 192/48.92 X |
| 4,883,152 A | 11/1989 | Froment | |
| 5,476,165 A | * 12/1995 | Awaji et al. | ............... 192/41 R |
| 5,529,158 A | 6/1996 | Itoh et al. | |
| 5,868,888 A | 2/1999 | Don et al. | |
| 5,954,174 A | 9/1999 | Costin | |
| 5,989,390 A | 11/1999 | Lee | |

FOREIGN PATENT DOCUMENTS

| | | |
|---|---|---|
| DE | 1183334 | 8/1965 |
| DE | G 69325366 | 11/1969 |
| DE | 97279 | 2/1972 |
| DE | 2601221 A1 | 8/1976 |
| DE | 3726370 A1 | 2/1988 |
| DE | 4231411 A1 | 3/1994 |
| DE | 4445634 A1 | 6/1996 |
| DE | 29817476 U1 | 3/2000 |
| EP | 0132759 A1 | 2/1985 |
| EP | 0284471 A2 | 9/1988 |
| EP | 0369867 A | 5/1990 |
| EP | 0436270 A1 | 7/1991 |
| EP | 0494681 A1 * 7/1992 | .................. 192/42 |
| GB | 0784200 | 5/1957 |
| GB | 2131505 A | 10/1985 |
| WO | WO 94/27057 | 8/1993 |

* cited by examiner

Primary Examiner—Richard M. Lorence
(74) Attorney, Agent, or Firm—Harness, Dickey & Pierce, P.L.C.

(57) ABSTRACT

A driving arrangement with a free-wheel coupling has a coupling sleeve (1) and a coupling hub (10) rotatably supported in the coupling sleeve (1). Both are connected, via locking pawls (24), so that, during driving of the coupling hub (10), a slaving of the coupling sleeve (1) takes place. However, a faster rotation of the coupling sleeve (1) is allowed so that the coupling sleeve (1) can overtake the coupling hub (10). Belleville springs (25, 29) achieve a breaking effect with large lagging masses. The Belleville springs (25, 29) are kept non-rotational relative to the coupling hub (10) and are supported on the end faces (8, 9) of the coupling sleeve (1). The Belleville springs (25, 29) are pre-tensioned by means of a friction face (26).

10 Claims, 3 Drawing Sheets

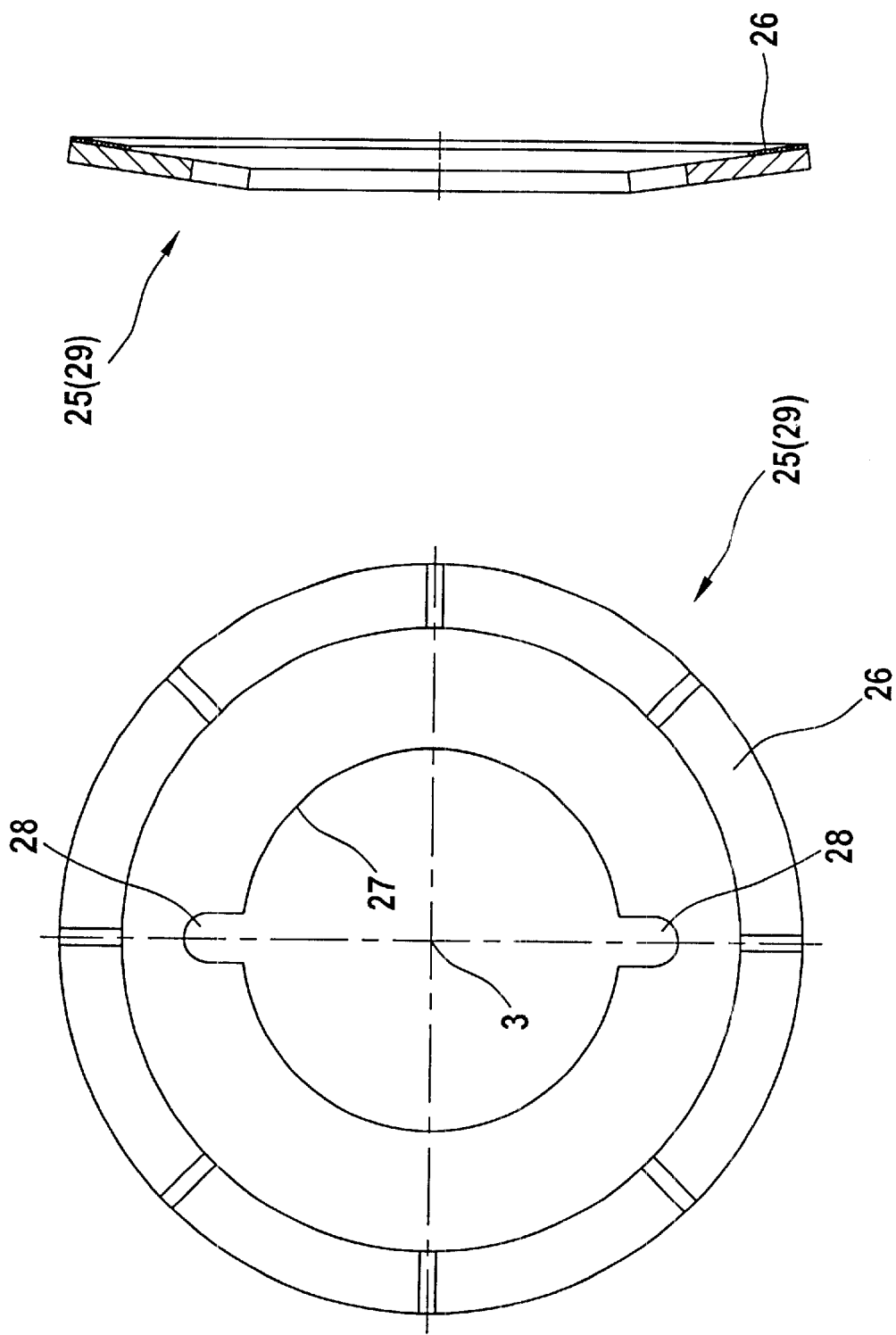

DRIVING ARRANGEMENT WITH A FREE-WHEEL COUPLING

CROSS-REFERENCE TO RELATED APPLICATIONS

This application is based upon and claims priority to German Patent Application 100 25 720.8 filed May 25, 2000, which application is herein expressly incorporated by reference.

FIELD AND BACKGROUND OF THE INVENTION

The present invention relates to a driving arrangement with a free-wheel coupling. The free-wheel coupling has a coupling sleeve and a coupling hub rotatably supported around a rotational axis in the coupling sleeve. During driving of the coupling hub in a rotational driving direction, a means causes a rotational slaving of the coupling sleeve in the rotational driving direction. The means enables a faster rotation of the coupling sleeve in the rotational driving direction than the coupling hub without rotational slaving.

Free-wheel couplings are known in very different constructional designs. In many driving systems, free-wheel couplings are used as overrunning clutches to protect the drive from lagging masses. According to the size of the rotating masses and the friction resistance of the system, different lag times are caused for the rotating elements. In agricultural machinery, it is important to limit the lag times of the rotating masses and the operational tools. Accordingly, this enables the operator to carry out work on the agricultural machinery such as removing foreign bodies. It is also known to provide separate electrical, hydraulic or mechanical breaks to reduce the lag times. This is cumbersome, and it requires high cost and separate control elements.

SUMMARY OF THE INVENTION

The invention provides a driving arrangement which offers an inexpensive solution to reduce lag times of the rotating masses and the operating tools.

A driving arrangement according to the invention, includes a free-wheel coupling with a coupling sleeve, and a coupling hub rotatably supported in the coupling sleeve around a rotational axis. A means causes a slaving of the coupling sleeve in the rotational driving direction when the coupling hub is driven in a rotational driving direction. This enables a faster rotation of the coupling sleeve in the rotational driving direction than the coupling hub without rotational slaving. The coupling sleeve has a first end face and a second end face. A Belleville spring is non-rotatably positioned relative to the coupling hub. The Belleville spring is pre-tensioned to frictionally abut, via a friction face, one of the end faces of the coupling sleeve.

In this driving arrangement it is advantageous that components of the free-wheel coupling can be used to reduce the lag times. Thus, a free-wheel coupling, which is used as an overrunning clutch, can also have, at the same time, a breaking function. Since both functions are combined into one component, the required installation space is minimized. This achieves a correspondingly compact design. Furthermore, the production costs are reduced since the components of the free-wheel coupling can also be used to take over the function as a break.

According to a second aspect of the present invention, the pretensioned Belleville springs are supported, via a friction face, against both end faces of the coupling sleeve. To increase the friction effect, the friction faces of the Belleville springs and/or the corresponding end faces of the coupling sleeve include means to increase the friction coefficient. Accordingly, a friction coating or a friction lining is used. A carbon paper is a proposed example of a friction lining. Friction coatings are advantageously arranged on the friction faces of the Belleville spring. The attachment is carried out below the annealing temperature of the material, from which the Belleville spring is manufactured. Therefore finished Belleville springs can be coated with a friction coating. In order to ensure that the Belleville spring is pre-tensioned and that a rotational fast connection to the coupling hub is achieved, each Belleville spring is connected to the coupling hub via projections or pins on the coupling hub. The projections or pins extend parallel to the rotational axis and recesses. The recesses are arranged on the Belleville spring to engage the projections or pins.

The pins are displaceably received in the bores of the coupling hub. Thus, the axial displacement of the smaller diameter of the Belleville spring for pre-tensioning during mounting is without effect on the connection with the coupling hub. Further, the pre-tensioning of the Belleville spring is adjustably designed so that adjustment can be carried out at a later stage.

Advantageously, the free-wheel coupling includes locking pawls as the rotational slaving between the coupling sleeve and the coupling hub. Such free-wheel couplings are simple in design and ensure a secure switching on or changing over to the torque transmission position. At the same time, it is advantageous that the Belleville springs ensure a softer switching on characteristic of the free-wheel coupling. This is improved due to the frictional arrangement.

In a further aspect of the invention, the coupling sleeve supports a gear. The coupling hub is connected to a shaft. Both form components of a gear box. Therefore, the friction lining or friction face can be carried out for a wet operation. The friction heat produced during the slowing down of the lagging masses can easily be transmitted away, via oil provided in the gear box housing.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is shown in the drawing and is described in detail below:

FIG. 3 is an enlarged plan view of a Belleville spring of FIG. 1.

FIG. 4 is a cross-sectional view of FIG. 3.

DETAILED DESCRIPTION OF THE PREFERRED EMBODIMENTS

Figure 1:
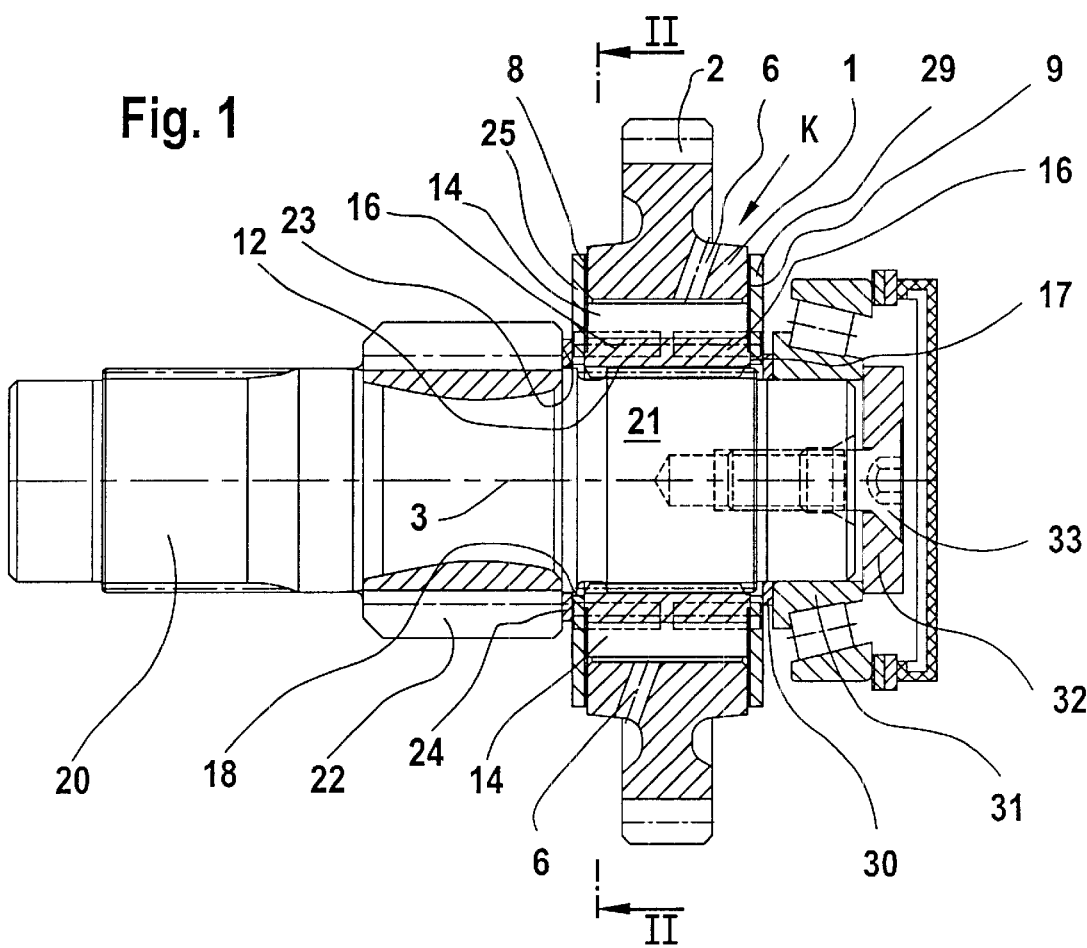
FIG. 1 is a longitudinal section view of a driving arrangement according to the invention.
Figure 2:
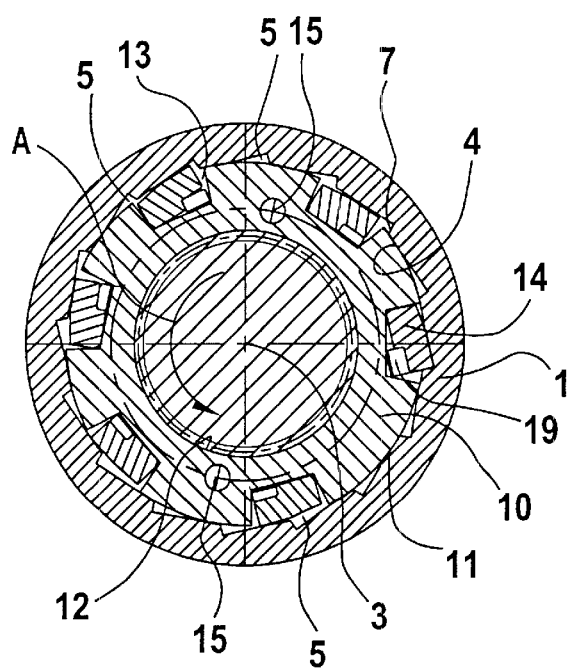
FIG. 2 is a cross-section view along line II—II of FIG. 1.

FIGS. 1 and 2 are described together. The coupling sleeve 1 is connected to an end toothed gear 2. The coupling sleeve 1 is rotatable around the rotational axis 3. The coupling sleeve 1 has a support bore 4, centered on the rotational axis 3. Support recesses 5 are arranged around the circumference of the bore 4. The recesses 5 have support faces 7 which extend parallel to the rotational axis 3. Sixteen support recesses 5 are shown. The support recesses 5 are arranged equally distanced around the circumference of the support bore 4. Two lubricating bores 6 start from the outer circumference of the coupling sleeve 1 and end in the support bore 4. The coupling sleeve 1 has a first end face 8 and a second end face 9 arranged along the rotational axis 3.

A coupling hub 10 is arranged in the support bore 4 of the coupling sleeve 1. The coupling hub 10 has its cylindrical outer face 11 rotatably supported in the bore 4. The coupling hub 10 on its circumference has six distributedly arranged recesses 13. The recesses 13 extend parallel to the rotational axis 3. Locking pawls 14 are pivotably supported around axes in the recesses 13. The axes extend parallel to the rotational axis 3. The locking pawls 14 can be displaced by springs 19 from a first position, retreated into the recesses 13, to a second position, projecting over the outer face 11 engaging a corresponding support recess 5. The springs 19 are active between the bottom of a recess 13 and the corresponding locking pawl 14. In the swung-out condition, the locking pawl 14 contacts a face of the support face 7. The opposing face is supported on a wall of the recess 13. This design is preferred so that during driving of the coupling hub 10 in the rotational driving direction A, a rotational slaving of the coupling sleeve 1 in the counter-clockwise direction is carried out. The coupling hub 10 has a toothed bore 12 centered on the rotational axis 3.

Pin bores 15 extend from the end faces 8, 9. The pin bores 15 extend parallel to the rotational axis 3. The pin bores 15 receive pins 16, which project beyond the hub end faces 17, 18. The coupling sleeve 1 with the gear 2, the coupling hub 10 and the locking pawls 14 form the free-wheel coupling K, which is designed as an overrunning clutch. Namely, the coupling sleeve I can overrun the coupling hub 10 when the drive is switched off. Thus, the coupling sleeve 1 rotates faster in the rotational driving direction A than the coupling hub 10. Accordingly, no rotational slaving takes place between the two.

The coupling hub 10 is carried with its toothed bore 12 on a toothed seat portion 21 of a shaft 20. The shaft 20 further has a pinion 22, which forms a shoulder 23. A first support ring 24 is supported on shoulder 23. A first Belleville spring 25 with its small diameter is supported against the ring 24. This first Belleville spring 25 is shown in FIGS. 3 and 4. On its large diameter, it has a friction face 26. A lining made from carbon paper to increase the friction coefficient is on friction face 26. The first Belleville spring 25 has a bore 27. Recesses 28 radially extend from bore 27. The pins 16, projecting from the hub end face 18, engage recesses 28 so that the first Belleville spring 25 is kept rotationally fast to the coupling hub 10.

The first Belleville spring 25 is frictionally supported by friction face 26 on the first end face 8 of the coupling sleeve 1. A second Belleville spring 29 is supported on the second end face 9 of the coupling sleeve 1. The second Belleville spring 29 is formed correspondingly to the first Belleville spring 25. The second Belleville spring 29 is kept rotationally fast by the pins 16, which project from the hub end face 17. Accordingly, the second Belleville spring 29 is rotationally fast to the coupling hub 10. The friction face 26 on the large diameter of the second Belleville spring 29, abuts the second end face 9 of the coupling sleeve 1. The small diameter of the second Belleville spring 29 abuts the second support ring 30. The second support ring 30 is impinged by the inner bearing race 31 of a tapered roller bearing. The inner bearing race 31 is impinged by a pressure disc 32. The pressure disc 32 is pre-tensioned by a screw 33. The screw 33 is screwed into a threaded bore of the shaft 20 more or less deep, so that the necessary friction force or pre-tensioning of the Belleville springs 25, 29 can be adjusted.

Figure 5:
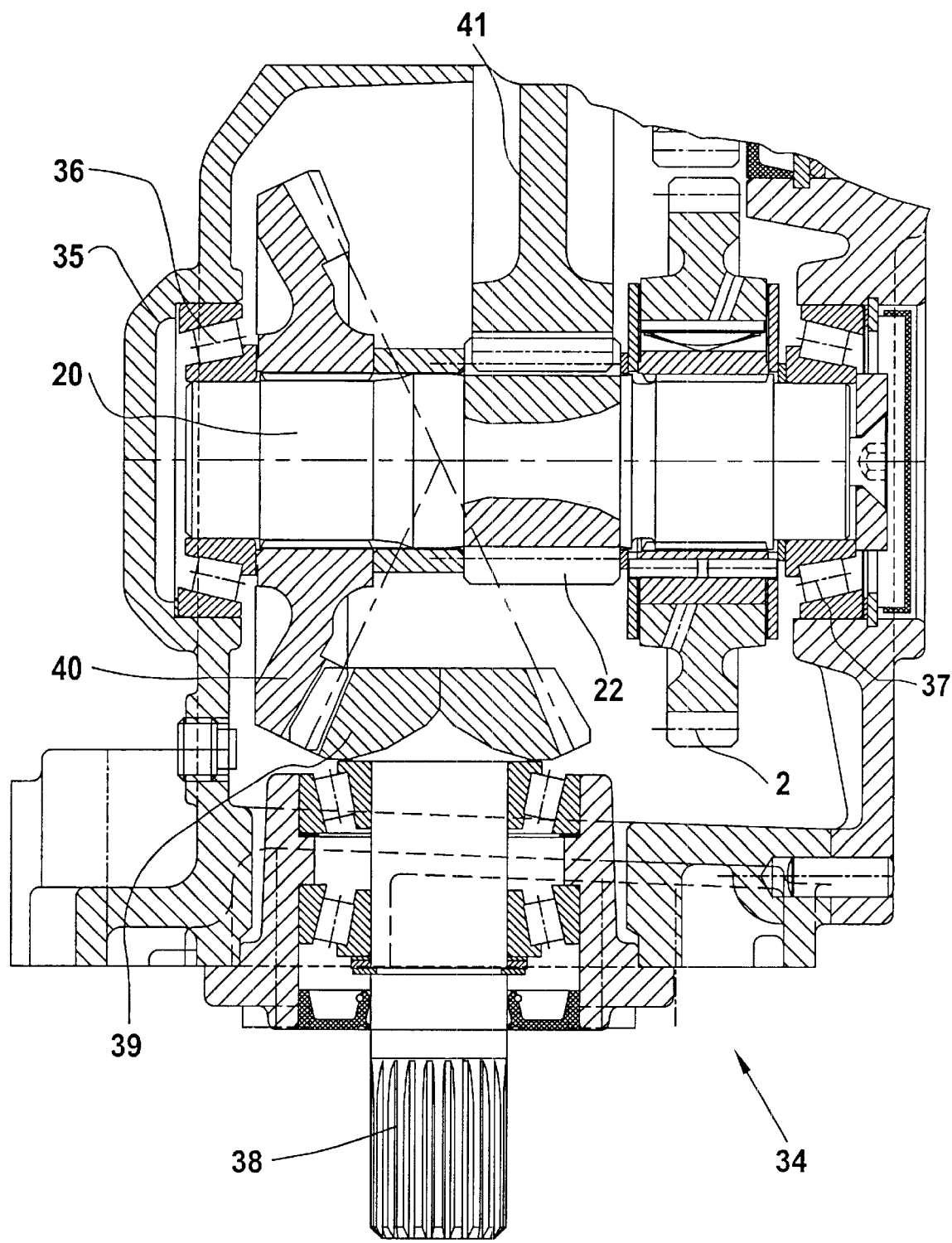
FIG. 5 is a cross-sectional view of a portion of a gear box, with a driving arrangement according to the invention.

FIG. 5 shows the arrangement of the driving arrangement according to the invention in a gear box 34. The gear box 34 has a housing 35. The shaft 20 shown in FIGS. 1 and 2 is supported in the bearings 36, 37 in the housing 35. A component of the bearing 37 is the inner bearing race 31 of FIG 1. Additionally, a second bevel wheel 40 is non-rotationally attached on the shaft 20. The second bevel wheel 40 is driven by a first bevel wheel 39. The first bevel wheel 39 is connected to the driving trunnion 38. The driving trunnion 38 extends from the housing 35 of the gear box 34. The driving trunnion 38 provides drive to the system. The pinion 22 meshes with a gear 41. The gear 2 meshes with a gear not shown. Both serve as driving elements for a device independently rotating from each other.

While the above detailed description describes the preferred embodiment of the present invention, the invention is susceptible to modification, variation and alteration without deviating from the scope and fair meaning of the subjoined claims.

What is claimed is:
1. A driving arrangement, comprising:
 a free-wheel coupling having a coupling sleeve and a coupling hub rotatably supported in the coupling sleeve around a rotational axis;
 means for causing a slaving of a coupling sleeve in the rotational driving direction when driving the coupling hub in the rotational driving direction, said means enabling a faster rotation of the coupling sleeve in the rotational driving direction than the coupling hub without rotational slaving;
 the coupling sleeve having a first end face and a second end face; and
 a Belleville spring non-rotatably kept relative to and acting directly on the coupling hub, said Belleville spring has a pre-tensioned friction face frictionally abutting one of the end faces of the coupling sleeve.
2. The driving arrangement according to claim 1, wherein a Belleville spring is pre-tensionally supported, via a friction face, against each end face.

3. The driving arrangement according to claim 1, wherein the friction face and/or the associated end face include means for increasing friction.

4. The driving arrangement according to claim 3, wherein the means for increasing friction being a frictional coating or a frictional lining.

5. The driving arrangement according to claim 4, wherein the frictional lining includes a carbon paper connected to the friction face.

6. The driving arrangement according to claim 2, wherein each Belleville spring is connected to the coupling hub via projections or pins on the coupling hub, said projections or pins extending parallel to the rotational axis, and recesses arranged on the Belleville spring, said projections or pins engaging said recesses.

7. The driving arrangement according to claim 1, wherein the projections or pins are displaceably received in bores of the coupling hub.

8. The driving arrangement according to claim 1, wherein the pre-tensioning of the Belleville spring is adjustable.

9. The driving arrangement according to claim 1, wherein said means for causing slaving including locking pawls for rotationally slaving the coupling sleeve by the coupling hub.

10. The driving arrangement according to claim 1, wherein the coupling sleeve carries a gear and the coupling hub is connected to a shaft and form components of a gear box.

* * * * *